T. FAIRFIELD.
MEANS FOR TRANSFERRING LIQUIDS TO OR FROM SHIPS OR VESSELS.
APPLICATION FILED OCT. 23, 1914.

1,188,426.

Patented June 27, 1916.
3 SHEETS—SHEET 1.

T. FAIRFIELD.
MEANS FOR TRANSFERRING LIQUIDS TO OR FROM SHIPS OR VESSELS.
APPLICATION FILED OCT. 23, 1914.

1,188,426.

Patented June 27, 1916.
3 SHEETS—SHEET 3.

UNITED STATES PATENT OFFICE.

THOMAS FAIRFIELD, OF LONDON, ENGLAND.

MEANS FOR TRANSFERRING LIQUIDS TO OR FROM SHIPS OR VESSELS.

1,188,426. Specification of Letters Patent. Patented June 27, 1916.

Application filed October 23, 1914. Serial No. 868,313.

*To all whom it may concern:*

Be it known that I, THOMAS FAIRFIELD, a subject of the King of Great Britain and Ireland, residing at 20 Gloucester Crescent, Regent's Park, London, England, have invented certain new or Improved Means for Transferring Liquids to or from Ships or Vessels, of which the following is a specification, reference being had therein to the accompanying drawings.

This invention relates to means or apparatus for transferring oil or other liquids to ships or vessels.

It consists particularly in the provision of a new combined hawser and hose, or tubular hawser, by means of which the two operations of towing and feeding may be performed simultaneously, and of new or improved apparatus whereby the said tubular hawser may be rapidly connected and secured to the ship or vessel to be fed and to the source of supply.

It consists further in the provision of means whereby two or more tubular hawsers may be attached to the connecting apparatus and thereby two or more ships or vessels may be simultaneously fed.

Figure 1:
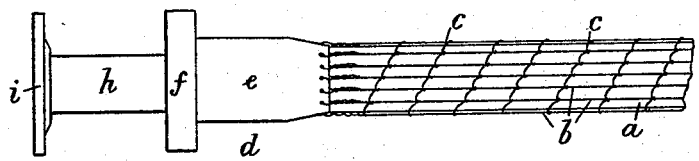
Figure 2:
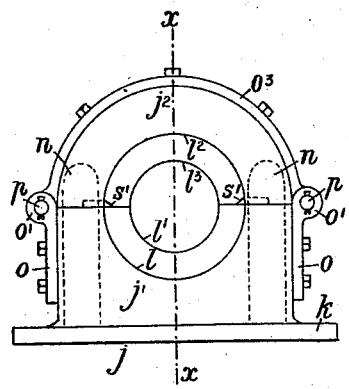
Figure 5:
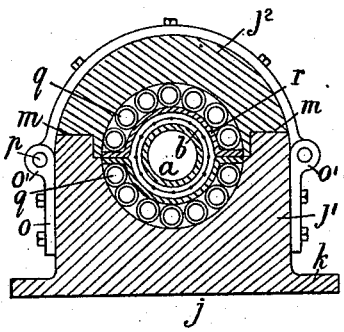
Figure 3:
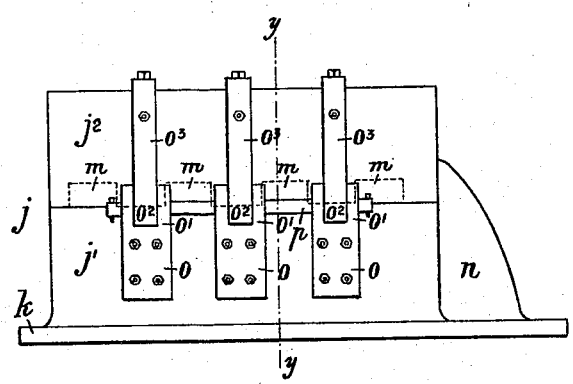
Figure 4:
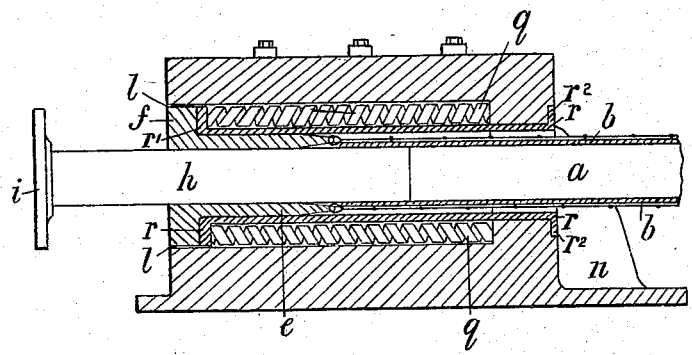
Figure 6:
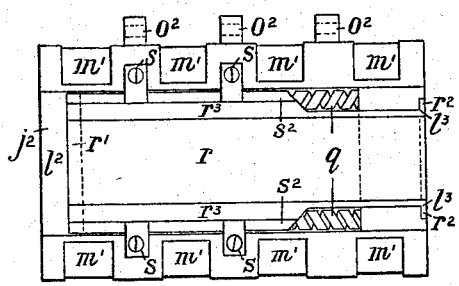
Figure 7:
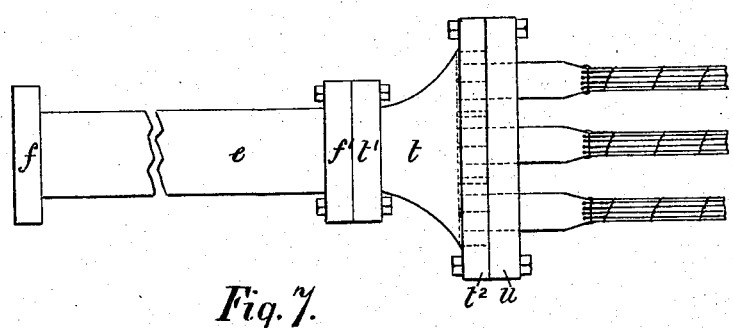
Figure 8:
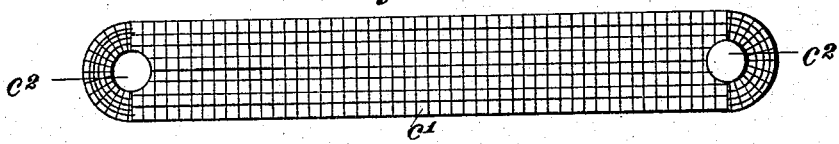
Figure 9:
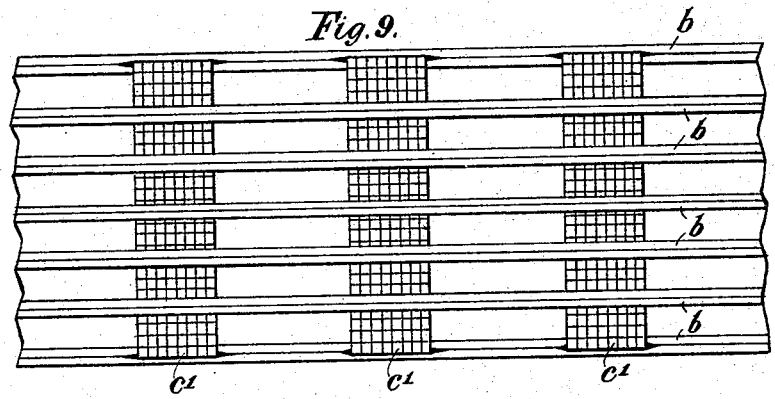
Figure 10:
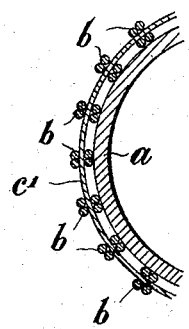

Referring to the accompanying drawings:—Figure 1 is a side elevation of one end of the tubular hawser, Fig. 2 an end elevation of a casing in which one end of said tubular hawser is housed and secured, Fig. 3 a side elevation of said casing, Fig. 4 a sectional elevation thereof taken on line $x$—$x$, Fig. 2, showing the interior parts and the tubular hawser assembled therein, Fig. 5 a similar elevation on line $y$—$y$, Fig. 3; Fig. 6 a view of the interior of the upper part of casing with springs and retaining plate in position. Fig. 7 a plan of the apparatus for connecting two or more tubular hawsers to the casing. Fig. 8 is a view of a woven wire jacket or bracelet which may be applied to the tubular hawser to resist radial stresses thereon; Fig. 9 is a view of a short length of hawser with said jacket or bracelet applied thereto; and Fig. 10 is a transverse sectional view of the hawser shown in Fig. 9.

Like letters refer to like parts throughout the several views.

The tubular hawser is constructed in the following manner:—Any desired length of ordinary or armored hose, such as $a$, has a number of ropes $b$, of steel or other suitable material, arranged in a longitudinal direction around its periphery, the size and strength of such ropes being varied according to the towing or pulling strain which they are intended to bear. A rope $c$ is connected to and bound around ropes $b$ for the purpose of keeping the latter in position on the hose and also for resisting the interior pressure on the hose when the liquid is being pumped through same. In place of the rope $c$, I may employ a number of woven wire jackets or bracelets, such as $c^1$, which will be passed through the ropes $b$ and have their ends secured together or wire clips passed through holes $c^2$ or other suitable fastening means. Ropes $b$ are connected at each of their ends to a coupling device $d$ consisting of a tube $e$ of metal, preferably steel, provided with a flanged end $f$. As shown in the drawings, these ends are passed through holes in the tube $e$ and then spliced. A tube $h$ with flanged end $i$ passes through coupling $d$ and extends for a certain distance into hose $a$. To allow for any stretching of ropes $b$ and consequent movement of hose $a$ and tube $h$ the latter projects beyond the flange of the coupling device $d$.

The construction of the apparatus for receiving and securing the tubular hawser is as follows:—A casing $j$ in two parts, $j^1$, $j^2$, has a flange $k$ by means of which it may be bolted or otherwise secured in position, the lower part $j^1$ being provided with interior semi-circular recesses $l$, $l^1$, and with teeth $m$ (Figs. 3 and 5) projecting above its walls. Buttresses $n$, $n$, are provided at its rear ends. The upper part $j^2$ of said casing has corresponding interior recesses $l^2$, $l^3$, the side walls having recesses $m^1$ (Fig. 6) adapted to receive the teeth $m$. The two parts of the casing $j$ are held together by means of plates $o$, ending in recessed and eyed bosses $o^1$, bolted or otherwise secured to the lower part, the recesses of bosses $o^1$ being adapted to receive the eyed bosses $o^2$ of the plates $o^3$ secured to the upper part. Rods $p$ are then passed through the registering eyes of the respective bosses. It will be obvious that in this construction the rods and bosses form hinges and that by removing one of the rods $p$ the upper part of the casing may be turned back. Spiral springs $q$ are arranged in the recesses $l$, $l^2$ and are of shorter length than such recesses. To prevent them interlocking these springs are made of metal of a thickness greater than the space between the coils. They are held in position by semi-circular metal trays $r$ having flanged ends $r^1$, $r^2$, and side flanges $r^3$. The latter are cut away at some distance from the end of the tray, as shown in Fig. 6. The end portions of the trays $r$ fit slidably in the recesses $l^1$, $l^3$, the flanges $r^2$ engaging in a recess in the rear end of the casing, while the flanged ends $r^1$ and flanges $r^3$ fit slidably within the recesses $l$, $l^2$. To prevent the upper tray $r$ from falling out when the part $j^2$ is turned on one of its hinges, plates $s$ are let into the bottom of the side walls of said part and fixed thereto. One end of each of these plates is beveled and projects into the recess $l^2$ as shown at $s^1$, these projecting ends fitting under the correspondingly beveled edges $s^2$ of the upper tray, and thereby supporting same.

Connecting apparatus of the kind described will be fitted to all ships or vessels employing oil fuel, preferably at each end thereof. Oil carrying ships or "tankers" will be fitted in a similar manner and will also carry the tubular hawser. In use, one end of this hawser (the opening in which is closed by a cap) will be transferred from the "tanker" to the ship or vessel requiring fuel. The upper part of the connecting apparatus on the latter will be turned back on one of its hinges and the end of the hawser dropped into the lower tray $r$, one half of the flanged end $f$ of the hawser coupling fitting within the recess $l$ and bearing against the flanged end $r^1$ of said tray. The upper part of the connecting apparatus is then fixed to the lower part by means of the rod $p$, the hawser coupling and part of the hawser being housed within such apparatus in the manner shown in Fig. 4. The flanged tubes $h$ at the ends of the tubular hawser are connected by any suitable means to the tanks on the respective ships. One ship is towed by the other, and the oil or other fluid is pumped through the tubular hawser, the springs $q$ of the apparatus preventing, or minimizing the effect of any sudden strain on hawser. Ships at anchor, or fastened to buoys, may be fed in a similar manner from a supply station on shore fitted with the connecting apparatus. When small vessels or ships are to be fed, two or more of them may be connected to the "tanker," or to the shore supply station, and filled simultaneously by means of the alternative construction of end coupling shown in Fig. 7. In this construction the tube $e$ of coupling $d$ is lengthened so as to project from the rear end of the connecting apparatus, and is provided with an additional flange $f^1$. This flange is bolted or otherwise secured to one flange $t^1$ of an expanding piece $t$, the other flange $t^2$ of said piece being bolted or otherwise secured to a plate $u$. Before securing plate $u$ to the piece $t$ the metal tubes at the ends of two or more tubular hawsers are screw threaded and are screwed through said plate being secured on the inside thereof by nuts. These hawsers are provided with cut-off valves (not shown in the drawings) in case one vessel should be filled before the other or others.

Claims:—

1. Means for transferring liquid to or from ships or vessels embodying therein a hawser composed of a hose section, a plurality of longitudinally extending draft wires or ropes grouped about said hose section, and coupling members arranged at the opposite ends of said hose section, said draft wires or ropes being permanently connected with said coupling members whereby longitudinal stresses upon the hawser are limited to said wires or ropes, and means coöperating with said couplings whereby said hawser may be used to hold a vessel in a definite relation to the source of supply while fluid is being delivered through said hose section.

2. Means for transferring liquid to or from ships or vessels embodying therein a hawser composed of a hose section, a plurality of longitudinally extending draft wires or ropes grouped about said hose section, and coupling members arranged at the opposite ends of said hose sections, said draft wires or ropes being permanently connected with said coupling members whereby longitudinal stresses upon the hawser are limited to said wires or ropes, and means co-operating with said coupling members whereby said hawser may be used to hold a vessel in definite relation to the source of supply while fluid is being delivered through said hose section, said means including a spring draft rigging adapted to be engaged by said coupling member.

3. Means for transferring liquids to or from ships or vessels embodying therein a hawser composed of a hose section, a plurality of longitudinally extending draft wires or ropes grouped about said hose section and coupling members arranged at the opposite ends of said hose section, said draft wires or ropes being permanently connected with said coupling members whereby longitudinal stresses are limited to such wires or ropes, and a plurality of casings adapted to be secured adjacent a tank and upon a vessel, said casings each being provided with means adapted to be detachably connected with said coupling members whereby said hawser may be used to establish a definite relation between a vessel and the tank containing fluid as well as a conduit from which said fluid is passed between the tank and the ship.

4. Means for transferring liquid to or from ships or vessels embodying therein a hawser composed of a hose section, a plurality of longitudinally extending draft wires or ropes grouped about said hose section and flanged coupling members arranged at the opposite ends of said hose section, said draft wires or ropes being permanently connected with said coupling members whereby longitudinal stresses are limited to such wires or ropes, and a plurality of casings adapted to be secured adjacent a tank and upon a vessel, each comprising two sections having registering openings adapted to inclose one of said couplings, a spring seat within said openings, a flanged slidable member formed in two sections seated within said openings, a plurality of springs interposed between the flange of said member and said spring seat, means detachably connecting the two sections of said casing, and means whereby said springs and the section of said slidable member are held in relation to said movable section of said casing whereby said hawser may be used to establish a definite relation between a vessel and the tank containing fluid as well as a conduit from which said fluid is passed between the tank and the ship.

5. Means for transferring liquid to or from ships or vessels embodying therein a hawser composed of a hose section, a plurality of longitudinally extending draft wires or ropes grouped about said hose section and flanged coupling members arranged at the opposite ends of said hose section, said draft wires or ropes being permanently connected with said coupling members whereby longitudinal stresses are limited to such wires or ropes, a plurality of casings adapted to be secured adjacent a tank and upon a vessel, said casings each being provided with means adapted to be detachably connected with said coupling members whereby said wires or ropes may be used to establish a definite relation between a vessel and the tank containing fluid as well as a conduit from which said fluid is passed between the tank and the ship, and a short tube adapted to be placed in communication with the tank for the fluid slidably mounted in the coupling members and opening into said hose section whereby movement of said section and said coupling relatively to the tank is permitted.

6. Means for transferring liquid to or from ships or vessels embodying therein a plurality of casings adapted to be secured adjacent a tank and upon a vessel, a coupling member adapted to be detachably connected with one of said casings, a header connected with said coupling member, a plurality of hawsers each comprising a hose section, a metal tube at one end thereof, means connecting the metal tubes of each of said hawsers to said header, a coupling member arranged at the other end of each of said hose sections, and a plurality of draft wires or ropes grouped about each hose section, said draft wires or ropes being permanently connected with said coupling members and with one of said tubes connected with said header whereby longitudinal stresses upon the hawser are limited to said wires or ropes.

7. Means for transferring liquid to or from ships or vessels embodying therein a hose section, a hawser composed of a plurality of longitudinally extending draft wires or ropes grouped about said hose section, means operatively connected with said wires or ropes and encircling said hose whereby said wires or ropes are held in position and bursting pressures upon said hose sections are resisted and coupling members arranged at the opposite ends of said hose sections, said draft wires or ropes being permanently connected with said coupling members whereby longitudinal stresses upon the hawser are limited to said wires or ropes, and means coöperating with said coupling members whereby said hawser may be used to hold a vessel in a definite relation to the source of supply while fluid is being delivered through said hose section.

In testimony whereof I affix my signature in presence of two witnesses.

THOMAS FAIRFIELD.

Witnesses:
 HERBERT D. JAMESON,
 A. NUTTING.

Copies of this patent may be obtained for five cents each, by addressing the "Commissioner of Patents, Washington, D. C."